June 3, 1941. J. C. HODGE 2,244,064
WELDED PRESSURE VESSEL AND METHOD
Filed June 10, 1937
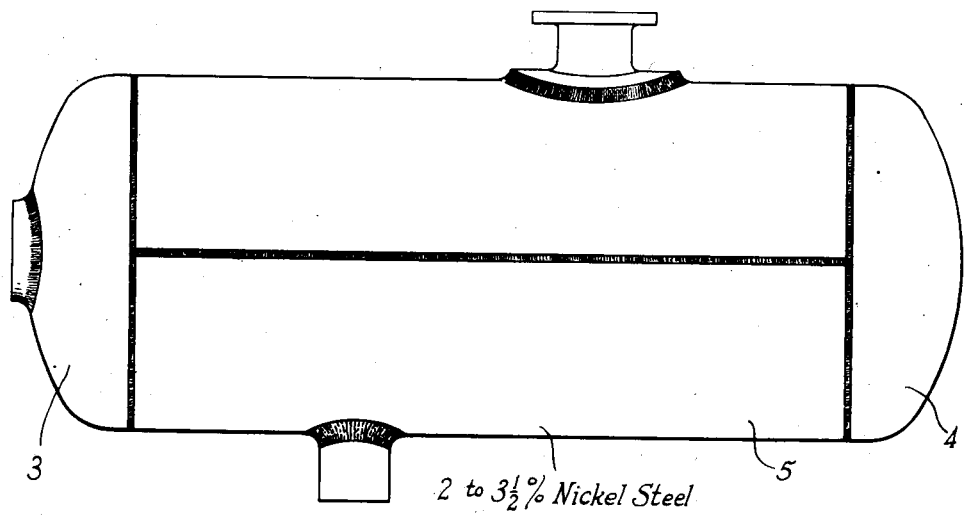
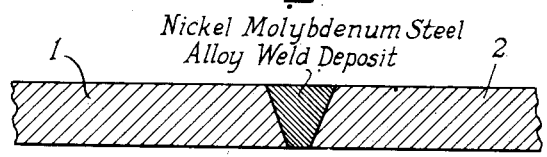
INVENTOR.
James C. Hodge
BY
ATTORNEY.

Patented June 3, 1941

2,244,064

UNITED STATES PATENT OFFICE 2,244,064

WELDED PRESSURE VESSEL AND METHOD

James C. Hodge, Barberton, Ohio, assignor to The Babcock & Wilcox Company, Newark, N. J., a corporation of New Jersey Application June 10, 1937, Serial No. 147,417

7 Claims. (Cl. 113—112)

Developments over the past few years have resulted in processes such as that of dewaxing oils, where pressure vessels have been required capable of withstanding relatively high pressures at extremely low temperatures, it not being unusual that a temperature as low or lower than −40° F. will be encountered.

One obstacle to the development of pressure vessels for use under such low temperature conditions is that the impact resistance of the metals employed is materially different than under conditions of pressure at the more usual elevated temperatures with which an enormous amount of experience has been gained over a long period of years.

An additional obstacle to the development of such vessels for low temperature processes has been that the great size of such vessels substantially precludes heat treatment for normalizing, or very materially adds to the cost of the vessel, and hence the advantages of welded construction were not generally available with the customary materials and procedure due to the necessity for heat treating after welding.

The present invention is a method for and an article in the form of a pressure vessel made, however, by fusion welding in a manner to withstand the extremely low temperatures at elevated pressures without usual necessity for heat treatment of the finished vessel.

Another feature is the forming of a pressure vessel from suitable metal components combined by fusion welding with a weld forming metal free of a critical brittle temperature range while cooling.

A further feature is a method and pressure vessel formed thereby wherein the vessel is fabricated from component parts, each of which is of a metal of the order of from 2 to 3½% nickel steel and which components are united by the fusion deposit of a nickel-molybdenum steel alloy. Welding may be done by the metal or carbon arc process.

The attached drawing forming a part of this specification illustrates one manner in which a pressure vessel is formed according to the present invention.

In the drawing—

Fig. 1 is a side elevation of the vessel.

Fig. 2 is a fragmentary sectional elevation showing a weld uniting components of the vessel.

In forming a typical pressure vessel shown in the drawing, adjacent edges of plates 1 and 2 as indicated in Fig. 2 and which are characteristic of the edges of components of the heads 3 and 4 and central part 5 of the vessel shown in Fig. 1, are milled or otherwise cut to form a weld metal-receiving groove between the said adjacent edges. This groove, while shown as a single V, may be of any usual form well known in the art such, for instance, as a U-shape, double V or straight side, and, if desirable, may be provided with a backing up strip.

In forming the vessel I have found that a material suitable for sub-zero temperatures is 3½% nickel steel, the general analysis range of which, in plates from ½" thickness upward, may be summarized as follows:

| | |
|---|---|
| Carbon (range) | 0.20 to 0.32 |
| Manganese (range) | 0.50 to 0.80 |
| Phosphorus | 0.04 |
| Sulphur | 0.05 |

However, while suitable for the general wall area of the vessel, when used at low temperatures, it is found that in uniting the 3½% nickel steel components by a fusion deposit of similar straight nickel steel great difficulty is experienced in producing uniform results and a sound weld, such welds evidencing the formation of cracks in the weld deposited metal, probably due in part to air hardening tendencies rendering the deposited metal at least partially martensitic, and also due to a probable critical brittle temperature range through which the weld deposited metal passes when cooling.

It is found, however, that if a dissimilar metal, not passing through such critical brittle temperature range, is used in uniting the components of 3½% nickel steel by fusion welding, then the tendency toward cracking of the structure at the welds is substantially eliminated.

One such metal that I have found which satisfactorily avoids this tendency toward cracking evidenced in the welds of 3½% nickel steel structures is nickel-molybdenum steel, and a particular alloy which has proved to be adequate for the purpose shows the following analysis:

| | |
|---|---|
| Carbon | 0.1 to 0.2 |
| Manganese | 0.3 to 0.6 |
| Phosphorus | 0.04 max. |
| Sulphur | 0.05 max. |
| Nickel | 1.5 to 2.00 |
| Molybdenum | 0.2 to 0.3 |

With the use of weldrod deposit metal, either coated or uncoated, or under neutral or reducing atmospheric conditions at the deposit point, I have found that it is practicable to unite 3½% nickel steel components with a uniform strength weld of sound porous free metal into a pressure vessel having substantially no tendency to crack along, within or adjacent the deposit, thus rendering it practicable to produce large pressure vessels of this character in a manner which permits omission of the step of normalizing.

While in the foregoing I have described my invention with reference to particular analyses of the metal alloys involved for the purpose of disclosing a workable and practicable method and structure it is, nevertheless, to be understood that in practicing the invention I may resort to any and all modifications falling within the scope of the appended claims defining the invention. In the claims, the term nickel steel, or alloy steel containing nickel, denotes an alloy steel containing nickel as the predominant alloying constituent, where applied to the material of the parts being welded.

I claim—

1. A pressure vessel for low temperature processing which comprises a body comprised of components formed of nickel steel alloy united by fusion deposits of nickel-molybdenum steel alloy free of a critical brittle temperature range while cooling and having high impact resistance at sub-zero temperatures.

2. A pressure vessel for low temperature processing which includes a body comprised of components formed of a metal of the order of 3½% nickel steel and united by fusion deposits of nickel molybdenum alloy free of a critical brittle temperature range while cooling and having high impact resistance at sub-zero temperatures.

3. A pressure vessel for low temperature processing which includes a body comprised of components formed of metal of the order of 2 to 3½% nickel steel and united by fusion deposits of nickel-molybdenum steel alloy free of a critical brittle temperature range while cooling and having high impact resistance at sub-zero temperatures.

4. A pressure vessel for low temperature processing which includes a body comprised of components formed of a metal of the order of 2 to 3½% nickel steel united by fusion deposits from a nickel-molybdenum steel alloy free of a critical brittle temperature range while cooling and having high impact resistance at sub-zero temperatures and including the following:

| | |
|---|---|
| Carbon range | 0.1 to 0.2 |
| Manganese | 0.3 to 0.6 |
| Phosphorus | 0.04 max. |
| Sulphur | 0.05 max. |
| Nickel range | 1.5 to 2.0 |
| Molybdenum range | 0.2 to 0.3 |

5. The method of fabricating a metallic structure having initially separate components united by fusion welding, for service requiring welded joints between components of high impact resistance at sub-zero temperatures, which consists in forming said components of alloy steel containing nickel and welding said components into a unitary structure with fusion welding metal of alloy steel including nickel and molybdenum in percentages whereby the welding deposit is substantially free of a critical brittle temperature range while cooling and high impact resistance is afforded at the required low temperatures.

6. The method of fabricating a metallic structure having initially separate components of nickel alloy steel united by fusion welding, for service at elevated pressures and low temperatures, which comprises forming said components of alloy steel containing nickel and welding said components into a unitary structure with fusion welding metal substantially free of a critical brittle temperature range while cooling, said welding metal being an alloy steel also containing nickel and including molybdenum ranging substantially from 0.2% to 0.3% whereby high impact resistance at sub-zero temperatures is afforded and the necessity of subsequent heat treatment of the finished structure for normalizing is substantially obviated.

7. A welded structure comprising components of alloy steel united by fusion deposited alloy steel including molybdenum substantially free of a critical brittle temperature range while cooling and having high impact resistance at low temperatures, said alloy steels each containing nickel as the predominant alloying constituent.

JAMES C. HODGE.